US006979150B1

(12) United States Patent
Varvel

(10) Patent No.: US 6,979,150 B1
(45) Date of Patent: Dec. 27, 2005

(54) IN-SITU CONTAINMENT AND EXTRACTION OF VOLATILE SOIL CONTAMINANTS

(75) Inventor: Mark Darrell Varvel, Idaho Falls, ID (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 132 days.

(21) Appl. No.: 10/670,259

(22) Filed: Sep. 26, 2003

(51) Int. Cl.[7] .............................................. B09B 1/00
(52) U.S. Cl. ........................... 405/128.15; 405/128.25; 405/128.57; 405/128.7
(58) Field of Search ....................... 405/128.1, 128.15, 405/128.2, 128.25, 128.3, 128.35, 129.57, 405/129.7

(56) References Cited

U.S. PATENT DOCUMENTS

| 4,730,672 | A |   | 3/1988  | Payne                        |
|-----------|---|---|---------|------------------------------|
| 4,745,850 | A | * | 5/1988  | Bastian et al. ...... 405/128.15 |
| 5,160,217 | A |   | 11/1992 | Metzer et al.                |
| 5,178,491 | A | * | 1/1993  | Graves et al. ........ 405/128.45 |
| 5,246,309 | A | * | 9/1993  | Hobby ................. 405/128.3 |
| 5,277,518 | A | * | 1/1994  | Billings et al. ......... 405/128.3 |
| 5,279,740 | A | * | 1/1994  | Basile et al. ........... 405/128.35 |
| 5,346,330 | A | * | 9/1994  | Bernhardt ............... 405/128.3 |
| 5,360,067 | A | * | 11/1994 | Meo, III ................ 405/128.25 |
| 5,584,605 | A | * | 12/1996 | Beard et al. .......... 405/128.25 |
| 5,791,825 | A |   | 8/1998  | Gardner et al.               |
| 5,893,680 | A |   | 4/1999  | Lowry et al.                 |
| 6,109,358 | A |   | 8/2000  | McPhee et al.                |

\* cited by examiner

*Primary Examiner*—John Kreck
(74) *Attorney, Agent, or Firm*—Brian J. Lally; Daniel D. Park; Paul A. Gottlieb

(57) ABSTRACT

The invention relates to a novel approach to containing and removing toxic waste from a subsurface environment. More specifically the present invention relates to a system for containing and removing volatile toxic chemicals from a subsurface environment using differences in surface and subsurface pressures. The present embodiment generally comprises a deep well, a horizontal tube, at least one injection well, at least one extraction well and a means for containing the waste within the waste zone (in-situ barrier). During operation the deep well air at the bottom of well (which is at a high pressure relative to the land surface as well as relative to the air in the contaminated soil) flows upward through the deep well (or deep well tube). This stream of deep well air is directed into the horizontal tube, down through the injection tube(s) (injection well(s)) and into the contaminate plume where it enhances volatization and/or removal of the contaminants.

28 Claims, 2 Drawing Sheets

IN-SITU CONTAINMENT AND EXTRACTION OF VOLATILE SOIL CONTAMINANTS

U.S. GOVERNMENT RIGHTS

The United States Government has rights in this invention pursuant to Contract No. DE-AC07-99ID13727, between the U.S. Department of Energy and Bechtel BWXT, LLC, representing Idaho National Engineering and Environmental Laboratory (INEEL).

TECHNICAL FIELD

The present invention relates to a novel approach for containing and removing toxic waste from a subsurface environment. More specifically the present invention relates to a system that contains and removes volatile toxic chemicals from a subsurface environment by enhanced passive soil vapor extraction (EPSVE).

BACKGROUND OF THE INVENTION

Soil contamination has become a major problem in the developed world. Chemicals from farms, underground storage units, industrial complexes and even residential areas are being released into the environment, contaminating surrounding soil, and threatening local water supplies. Particularly concerning is a group of chemicals known as VOCs. VOCs are volatile organic compounds found in products ranging from common household cleaners to gasoline additives. VOCs like trichloroethylene, benzene, toluene, and xylene have been linked to various environmental and health problems including cancer. The concern is that VOCs present in contaminated soil will seep into ground water.

The type of remediation used at a particular site is determined by a number of factors including, but not limited to: the diffusion constant of the contaminant, the porosity of the soil, the soil tortuosity, absorption/adsorption of the contaminant into/onto the soil, the ability of the adjacent soil to supply adequate thermal energy to vaporize the liquid contaminant, and other factors. See, U.S. Pat. No. 5,893,680, issued to Lowery et al., on Apr. 13, 1999, col. 2. Extremely contaminated sites often require costly remediation like excavation and/or thermal destruction, however, less contaminated sites can be managed with cheaper and less intrusive methods such as soil vapor extraction.

Soil vapor extraction (SVE) is a method that physically separates volatile contaminants from soil in vapor form. SVE is an in situ treatment method that uses vacuums, blowers and extraction wells to induce airflow in the subsurface to enhance the volatization of VOC compounds from unsaturated soil. Some vapor extraction methods also use injection wells to pump ambient air into the contaminated soil to help enhance the removal of volatile soil contaminants (this technique is known as air venting). Placing several injection wells around an extraction well creates a vacuum within the extraction well which assists in drawing the contaminants to the surface.

Following volatization, contaminants are drawn to the surface as a vapor by a vacuum where they can be treated and/or released into the atmosphere. In general, SVE is only effective in removing volatile compounds with a Henry's law constant of greater than 0.01 or a vapor pressure greater than 0.5 mm Hg (0.02 inches Hg).

There are two main types of soil vapor extraction methods: active soil vapor extraction (ASVE) and passive soil vapor extraction (PSVE). ASVE systems use active means such as pumps and/or vacuums to draw out soil contaminants while passive vapor techniques rely on less active forces such as changes in atmospheric pressure within and above the contaminated soil. Exemplary ASVE systems can be found in U.S. Pat. No. 4,730,673 issued to Payne; U.S. Pat. No. 5,160,217 issued to Metzer et al.; and U.S. Pat. No. 6,109,358 issued to Mc Phee et al. Payne is typical and teaches a closed loop system for removing volatile contaminants comprising: an extraction well surrounded by several injection wells. Pressurized air is actively injected into the soil through the injection wells and the air along with volatized chemicals are withdrawn under vacuum through the extraction well. The extracted air is subsequently processed by several scrubbers and filters and is then reinjected into the soil.

The disadvantages of using active vapor extraction include the high cost and complexity associated with powered pumps and vacuums. In addition, high volume extraction methods often exceed environmental air quality standards which in turn leads to costly air treatment.

Passive vapor pressure extraction (PSVE) is a soil remediation process that utilizes ambient meterological conditions in place of electrical or mechanical pumps and/or vacuums. An exemplary passive vapor extraction method can be found in U.S. Pat. No. 5,893,680 issued to Lowry et al. Lowry teaches utilizing naturally occurring barometric pressure oscillations between the air in the contaminated soil and the air pressure at the land surface to assist in the upward movement of volatile contaminants to the land surface. The obvious advantages of PSVE are the cost savings from not having to rely on powered pumps/vacuums and the fact that such systems are more easily implemented in remote locations.

The disadvantage of PSVE is that meteorological conditions that drive PSVE are often inconsistent in both time and degree. Thus PSVE tends to be less reliable and less effective than ASVE. Both ASVE and PSVE can be combined with other remediation techniques including: bioremediation (bioventing), air sparging, fracturing, chemical treatment and thermal enhancement to increase effectiveness.

The present invention teaches a system for enhanced passive soil vapor extraction (EPSVE) that combines the benefits of active and passive vapor extraction. The present systems provide a more consistent injection air source than is possible using traditional PSVE systems while eliminating the need for powered pumps and/or vacuums found in ASVE.

Furthermore, one embodiment of the present system contains volatile soil contaminants within an impermeable/semi-permeable barrier. The combination of vacuum forces and the use of a barrier allows containment of severely contaminated sites while more extensive remediation is planned and/or performed.

SUMMARY OF THE INVENTION

The present invention is an in-situ extraction system for removing and/or containing soil contaminants. More specifically, the invention is an in-situ extraction system for removing and/or containing volatile contaminants from a soil environment using EPSVE. EPSVE utilizes many of the principles of ASVE, PSVE, air venting, and soil containment to create a novel enhanced passive vapor extraction/containment system. The waste zone is defined as a subsurface volume containing contamination in any physical form, which requires remedial actions for site restoration.

FIRST EMBODIMENT

Implementing the system involves containing the contaminant plume and/or source within an in-situ barrier, drilling a deep well adjacent or in relative close proximity to the contaminant plume and/or source, but outside of the in-situ barrier; and placing at least two wells within the waste zone, one to be used as an injection well, and one to be use as an extraction well. Preferably, impermeable conduits are inserted into each well. The deep well conduit and injection conduit(s) are connected via a horizontal conduit which allows the flow of the relatively high pressure air from the bottom of the deep well to travel up through the deep well conduit, across the horizontal conduit, down through the injection conduit, and into the contaminated soil where the air enhances the volatization of the soil contaminants. The injection well(s) help(s) create a positive pressure within the waste zone, preferentially forcing contaminants to the soil surface through the extraction well(s) where they are processed and/or released into the atmosphere.

SECOND EMBODIMENT

The second embodiment of the present invention comprises essentially all the aspects of the first embodiment with the exception of using an in-situ barrier. The second embodiment eliminates the in-situ barrier and the deep well is placed adjacent to, but outside the waste zone.

OBJECTS OF THE INVENTION

An object of the invention is to provide a low cost, self-sufficient, soil cleaning system;

Another object of the invention is to provide a novel, low cost, self-sufficient, soil cleaning system that utilizes relatively high pressure air from a deep well to enhance soil vapor extraction;

Another object of the invention is to provide a novel, low cost, self-sufficient, soil cleaning system that overcomes the problems associated with the prior art;

Another object of the invention is to provide a novel, low cost, self-sufficient, soil cleaning system that extracts volatile soil contaminants without the need for mechanically or electronically powered vacuums and/or pumps;

Another object of the invention is to provide a novel, low cost, self-sufficient, soil cleaning system that can be easily installed and operated in remote areas.

DETAILED DESCRIPTION OF THE PREFERRED EMBODIMENTS

First Embodiment

Figure 1:
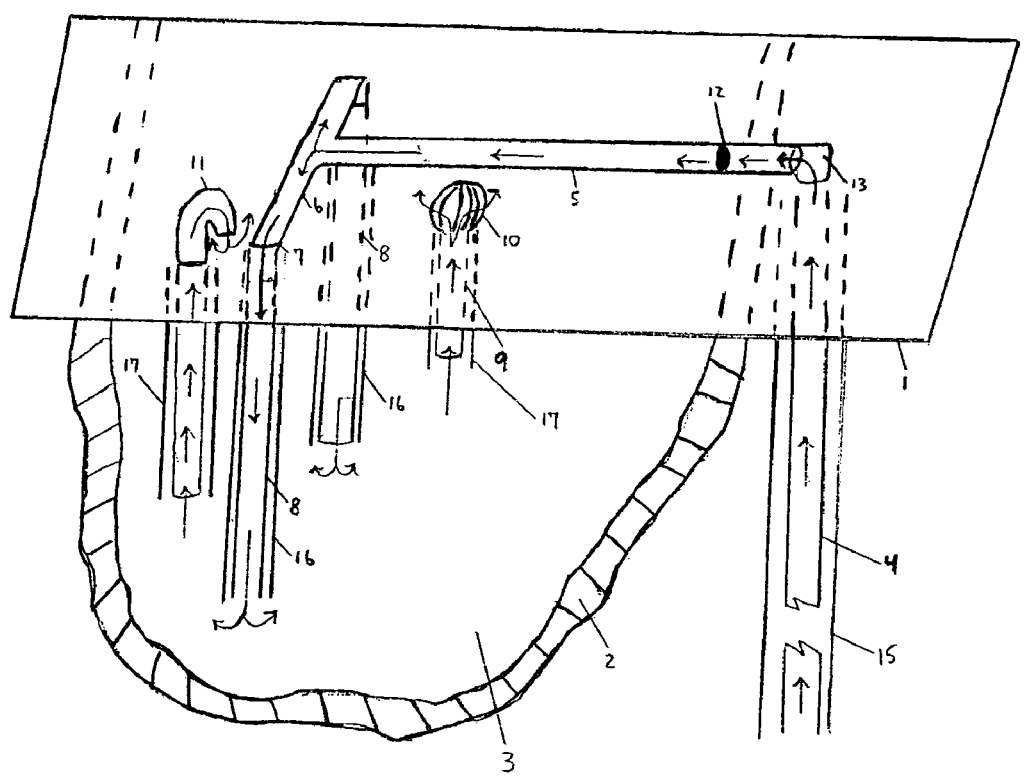
FIG. 1 is schematic representation of one embodiment of the present invention.

FIG. 1 shows a schematic view of one embodiment of the present invention. The present embodiment generally comprises a deep well 15, a horizontal tube 5, at least one injection well 16, at least one extraction well 17, and a means for containing the waste within the waste zone (in-situ barrier 2). During operation, air at the bottom of the deep well flows upward through the deep well 15 (or deep well tube 4). This stream of deep well air is then directed into the horizontal tube 5, down through the injection tube(s) 8 (injection well(s)) 16) and into the contaminate plume where it enhances volatization of the contaminants.

Implementation of the system begins by examining the waste zone 3 to determine the content, size, and location of the contaminant plume. This information combined with other site conditions are used to determine the number and position of the various injection 16 and extraction wells 17. Of particular importance is determining the radius of influence of the wells. For a more detailed discussion on determining radius of influence ("ROI") and other site evaluations procedures see, "Development of Recommendations and Methods to Support Assessment of Soil Venting Performance and Closure," Dominic D. DiGiulio et al., United States Environmental Protection Agency, (EPA/600/R-01/070/September 2001).

After the initial evaluation, the waste zone 3 is contained using an in-situ subsurface impermeable or semi-permeable barrier 2 to prevent migration of any chemical waste downward and/or laterally from the waste zone soil (as shown in FIG. 1). An exemplary barrier 2 is described in U.S. Pat. No. 5,791,825 issued to Gardner et al. which is hereby incorporated by reference in its entirety. Other suitable barrier systems including chemical barriers can also be employed.

Optionally an impermeable cap (not shown) can be placed across the land surface above the waste zone 3. The cap prevents precipitation from pooling in the subsurface, which could drive the contaminants downward. The cap can be made of any resilient impermeable/semipermeable material like plastic.

A deep well 15 is formed by drilling a borehole into the ground adjacent to the waste zone 3, but outside the barrier 2, as shown in FIG. 1. The deep well 15 can be formed using vertical or angled boring techniques and should be drilled to a depth consistent with subsurface geologic strata formations to provide pressure differentials (as described below) that give rise to air movement from the deep well into the waste zone to mobilize subsurface contaminants.

The air pressure at the bottom of a deep well is generally greater than that of atmospheric pressures at the land surface and/or the pressure at location of the contaminated soil (i.e. the air pressure within the rest of the system). Thus the relatively higher pressure air at the bottom of the deep well can be used to inject air into contaminated soil. The relatively high pressured deep well air will rise to the surface where it can be redirected downward into the waste zone 3 to encourage volatization. One of the keys to proper system function is the implementation of a one-way valve 12. The one-way valve 12 allows the relatively high pressure air from the deep well 15 to flow up through the deep well 15, into horizontal conduit 5, and down into the contaminated plume through the injection well 16, while preventing backflow. The valve 12 only allows air flow when the air pressure on the deep well side of the valve is greater than the pressure on the injection well side.

Using the pressure differential created by the deep well 15 to inject air into the waste zone 3 allows enhancement of volatization without the use of expensive vacuums or pumps employed by ASVE systems. Furthermore, the deep well 15 allows for more powerful and consistent air injection than previous PSVE methods which rely on weaker and less consistent soil vapor pressure oscillations. The depth of the well 15 can be varied according to soil and atmospheric conditions, however, the depth of the well should preferably be sufficient to produce an average air pressure differential between the air in the deep well and air within the horizontal tube (on the other side of the one way valve) large enough to attain air movement from the deep well into the waste zone to mobilize subsurface contaminants. The depth necessary to produce such a differential will depend on site specific subsurface conditions.

Alternatively, one can use a preexisting deep monitoring well that is adjacent to the remediation site.

It should be noted that the one-way valve 12 can be placed in various locations including within the injection well 16 (or injection tubes 8)—not shown, the horizontal conduit 5, or even within the deep well 15 (or deep well conduit 4)—not shown.

Preferably, the present invention includes a deep well tube 4 that acts as a support for the deep well 15 and helps protect it against collapse or other structural defect. The deep well tube 4 can be constructed out of any suitable gas-impermeable material used for underground wells. Acceptable materials include PVC, ABS and steel pipe. The deep well tube 4 is inserted into the pre-drilled deep well 15. (See FIG. 1). When the deep well tube 4 is in place it provides a conduit for the deep air to pass through, flowing from the bottom of the pipe up to the top of the well.

The lower end of the deep well 15 is backfilled with a permeable loosely packed material. Impermeable fill such as bentonite is then filled around the remaining length of deep well tube 4 to secure the tube 4 within the surrounding earthen material.

At least one injection well 16 is formed using the same drilling techniques as described above or using alternative methods (i.e., hydraulically inserted). The injection well(s) 16 should be emplaced to a depth within the contaminant source or plume. The injection well(s) 16 is/are vertical (or angled relative to ground surface 1) and extend(s) downward in the soil, terminating in the waste zone 3. Since the depth of the contaminant plume could vary in space and in time, several injection wells 16 can be used. In addition, the placement and depth of the injection wells 16 can be varied as remediation proceeds. It may be preferable to place several injection wells 16 around the extraction well(s) 17 to form a vacuum effect that forces soil vapor towards the extraction well 17 and up through the extraction well conduit 9.

Preferably, the injection well(s) 16 contain(s) a gas-impermeable liner or tube (herein called the injection conduit or tube 8) made of a suitable material like PVC, ABS or steel. The injection conduit(s) 8 is/are connected to the horizontal tube 6 as shown in the FIG. 1 or directly connected to the main portion of the horizontal tube 5 (not shown). The injection conduit 8 is inserted into the injection well 16. The injection conduit 8 (or the injection well 16) is connected to a branch of the horizontal tube 6 by a joint 7. The joint 7 should snuggly fit both the horizontal tube 5 and injection conduit 8 to limit any gas escape from the system. It is preferable that the joint 7 be air tight.

The diameters of all the conduits, wells and tubes in present system can be varied to achieve higher/lower gas volumes, velocities and pressures as conditions warrant.

The injection conduit 8 and joint 7 can be made of any acceptable gas-impermeable material including, but not limited to, PVC, ABS and steel pipe. The injection conduit(s) 8 direct(s) the deep well air from the horizontal tube 5 down into the waste zone 3. Preferably, permeable loosely packed material is emplaced in the lower end of the injection well 16. Impermeable fill such as bentonite is then filled around the remaining length of injection conduit 8 to secure the conduit 8 within the surrounding earthen material.

The top end of the deep well 15 (or deep well tube 4) is attached to the horizontal tube 5 that runs along the ground surface 1 or below the ground surface 1. In the present embodiment the position of the horizontal tube 5 is near the land surface 1, however, different locations above and below the surface can be imagined. The deep well 15 and horizontal tube 5 are connected by a joint 13 as shown in FIG. 1. Preferably the joint 13 is air tight.

The horizontal tube 5 as shown in FIG. 1 has a T-shaped terminus 6 on one end, however, the horizontal tube 5 can have multiple branches (not shown), or it can be a straight tube (not shown). Other shapes and sizes can also be envisioned. The horizontal tube 5 can be made of any acceptable material including, but not limited to, PVC, ABS and steel pipe.

In the present embodiment the horizontal tube 5 contains a one way valve 12, that controls the flow of air running through the system. The one-way valve 12 can be placed in the horizontal tube 5 between the deep well 15 (or deep well tube 4) and the first injection conduit 8 as shown in FIG. 1 or it can be placed in another satisfactory position as discussed earlier. The one-way valve 12 allows the deep well air to enter the horizontal tube 5 when subsurface pressure in the deep well 15 is greater than the barometric pressure on the other side of the one-way valve 12 (i.e. the pressure of the air around the contaminated soil). The valve 12 prevents the back-flow of air into the deep well 15 (or deep well tube 4). Preventing back-flow is important because it prevents contaminants from flowing into the deep well 15 and contaminating the air within the well.

It is important that the one-way valve respond to very small pressure changes. An acceptable sensitivity is approximately 0.05 millibar or less, although the sensitivity can be adjusted to the size of the system and relative pressure differentials at a site.

The present invention also includes at least one extraction well 17. The extraction well(s) 17 is/are formed using the same drilling techniques as described above or using alternative methods (i.e., hydraulically inserted). The extraction well(s) 17 should be emplaced to a depth just above the contaminant plume or source. The extraction well(s) 17 is/are vertical (or angled relative to ground surface 1) and extend(s) downward in the soil, terminating in the waste zone 3. Since the depth of the plume could vary in space and in time, several extraction wells 17 can be employed. In addition, the placement and depth of the wells 17 can be varied as remediation proceeds.

Preferably, the extraction well(s) 17 contain(s) a gas-impermeable liner or tube (herein called the extraction conduit 9 or extraction tube) made of a suitable material like PVC, ABS or steel. The extraction conduit 9 is inserted into the extraction well 17. Preferably, permeable loosely packed material is emplaced in the lower end of the extraction well 17. Impermeable fill such as bentonite is then filled around the remaining length of extraction conduit 9 to secure the tube 9 within the surrounding earthen material. When subsurface air is forced into the waste zone, it creates a positive pressure within this zone. The positive pressure creates a force which drives contaminants, by path of least resistance, to the extraction wells and subsequently to the ground surface where they are treated or released to the atmosphere.

The top of the extraction wells 17 (or extraction conduits 9) can be fitted with normal J vents 11 that allow the outward flow of soil vapor and help prevent precipitation from entering the system. Alternatively, extraction wells 17 (or extraction conduits 9) can be fitted with a wind or solar powered turbine 10. When operating, the turbine(s) 10 create a negative pressure at the ground surface (vacuum) thus enhancing contaminant removal through the extraction conduit 9 and assisting in the removal of contaminant vapors from the waste zone 3.

The number and position of the injection 16 and extraction wells 17 can be determined by the radius of influence. For more information on determining the radius of influence and other information regarding installation of injection/extraction wells see "Development of Recommendations and Methods to Support Assessment of Soil Venting Performance and Closure," Dominic D. DiGiulio et al., United States Environmental Protection Agency, (EPA/600/R-01/070/September 2001).

Optionally, the deep well 15 and extraction well(s) 17 can be used as monitoring wells to monitor the waste zone and surrounding areas. Various instruments can be used in conjunction with the wells including tensiometer and lysimeters. See, U.S. Pat. No. 5,644,947 issued to Hubbell et al., on Jul. 8, 1997.

Second Embodiment

Figure 2:
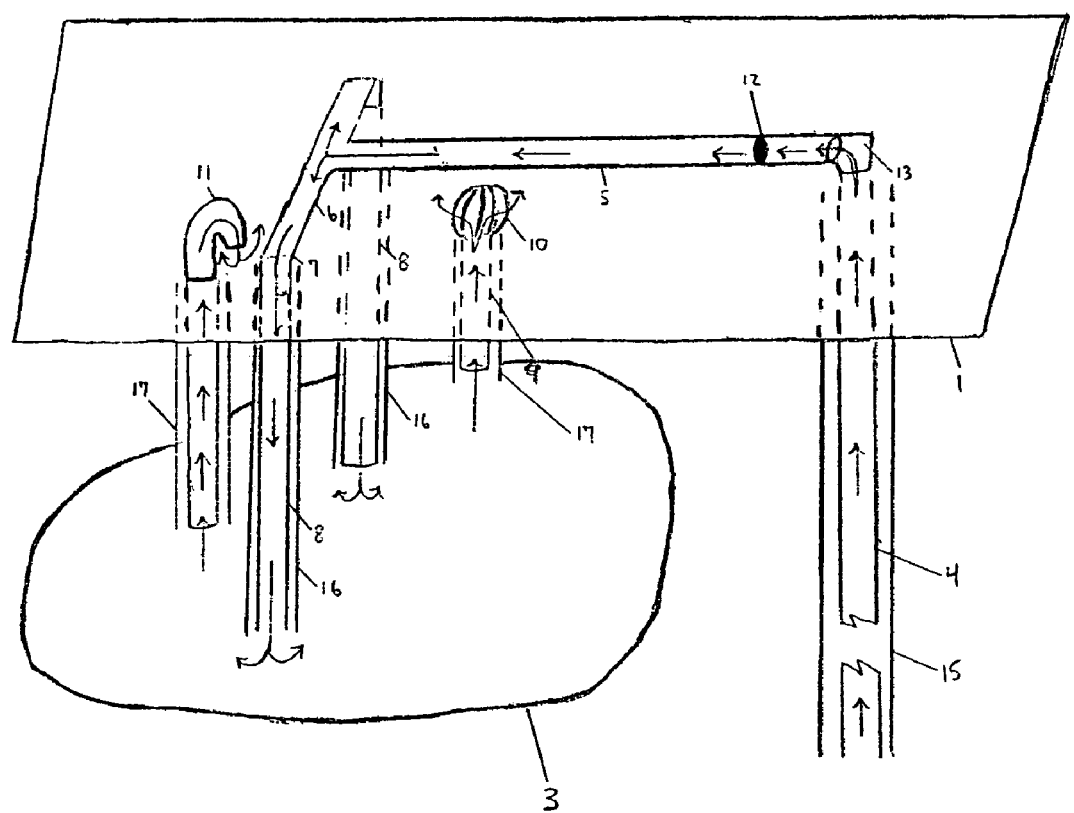
FIG. 2 is a second schematic representation of a second embodiment of the present invention.

The second embodiment of the present invention comprises essentially all the aspects of the first embodiment except that the second embodiment eliminates the in-situ barrier. The second embodiment eliminates the in-situ barrier and the deep well is placed adjacent or in close proximity to, but outside the waste zone as show in FIG. 2.

The described systems can also be fitted with supplemental vacuums and/or pumps to increase effectiveness.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations therefore, is not intended to limit the claimed processes to any order except as may be specified in the claims. Accordingly, the invention is limited only by the following claims and equivalents thereto.

All publications and patent documents cited in this application are incorporated by reference in their entirety for all purposes to the same extent as if each individual publication or patent document were so individually denoted.

I claim:

1. An enhanced passive soil vapor extraction system for remediating a site of specified locale that contains soil contaminated with volatile chemicals comprising:
    a deep well having an upper and lower end, the deep well having a specified depth and position relative to the contaminated site;
    one or more injection wells each having an upper and lower end, each injection well having a specified depth and location relative to the contaminated site, the lower end of the injection well being in fluid communication with the surrounding soil;
    a transfer conduit having a first and second end, a portion of the first end of the transfer conduit being coupled to the upper end of the injection well, the second end of the transfer conduit being coupled to the upper end of the deep well;
    one or more extraction wells each having an upper and lower end, each extraction well having a specified depth and location relative to the contaminated site, the upper end of the extraction well extending to the land surface, the lower end of the extraction well being in fluid communication with the surrounding soil;
    a means for preventing chemical migration of the chemicals horizontally and downward, the means creating a boundary around the contaminants; and
    wherein the depth of the deep well provides a great enough pressure differential between the deep well and contaminant site to produce air movement from the deep well, through the system and into the waste zone.

2. The enhanced passive soil vapor extraction system described in claim 1, wherein the deep well is located adjacent to the contaminated site but outside the means for prevention of chemical migration boundary.

3. The enhanced passive soil vapor extraction system described in claim 1, wherein the extraction well is located within the means for prevention of chemical migration boundary.

4. The enhanced passive soil vapor extraction system described in claim 1, wherein the injection well is located within the means for prevention of chemical migration boundary.

5. The enhanced passive soil vapor extraction system described in claim 1, further comprising a one-way check valve located within the transfer conduit, the valve having an injection side and deep well side, the valve only allowing air to flow when the pressure on the deep well side of the valve is higher than the pressure on the injection side of the valve.

6. The enhanced passive soil vapor extraction system described in claim 1, further comprising a one-way check valve located within the upper end of the deep well, the valve having an injection side and a deep well side, the valve only allowing air to flow when the pressure on the deep well side of the valve is higher than the pressure on the injection side of the valve.

7. The enhanced passive soil vapor extraction system described in claim 1, further comprising a one-way check valve located within the injection well, the valve having an injection side and a deep well side, the valve only allowing air to flow when the pressure on the deep well side of the valve is higher than the pressure on the injection side of the valve.

8. The enhanced passive soil vapor extraction system described in claim 1, wherein the means for preventing chemical migration is an in-situ impermeable or semipermeable barrier surrounding the contaminated soil.

9. The enhanced passive soil vapor extraction system described in claim 1, further comprising an impermeable or semipermeable barrier covering the land surface above the contaminated soil.

10. A soil vapor extraction system for remediating a site of specified locale that contains soil contaminated with volatile chemicals comprising:
    a deep well having an upper and lower end, the deep well having a specified depth and position relative to the contaminated site;
    one or more injection wells each having an upper and lower end, each injection well having a specified depth and location relative to the contaminated site, the lower end of the injection well being in fluid communication with the surrounding soil;
    a transfer conduit having a first and second end, a portion of the first end of the transfer conduit being coupled to the upper end of the injection well, the second end of the transfer conduit being coupled to the upper end of the deep well;
    one or more extraction wells each having an upper and lower end, each extraction well having a specified depth and location relative to the contaminated site, the upper end of the extraction well extending to the land surface, the lower end of the extraction well being in fluid communication with the surrounding soil;

a means for preventing chemical migration of the chemicals horizontally and downward, the means creating a boundary around the contaminants;

wherein the depth of the deep well provides a great enough pressure differential between the deep well and contaminant site to produce air movement from the deep well, through the system and into the waste zone; and further comprising a wind driven or solar powered turbine attached to the upper end of one or more of the extraction wells, thereby increasing the air flow from the extraction well.

11. The enhanced passive soil vapor extraction system described in claim 1, wherein the transfer conduit is branched.

12. The enhanced passive soil vapor extraction system described in claim 1, wherein the coupling of the transfer conduit and injection well creates a joint, the joint being air tight.

13. The enhanced passive soil vapor extraction system described in claim 1, wherein the coupling of the transfer conduit and deep well creates a joint, the joint being air tight.

14. The enhanced passive soil vapor extraction system described in claim 1, wherein the depth of the deep well is deeper than the injection well.

15. The enhanced passive soil vapor extraction system described in claim 1, wherein the depth of the deep well is 1–2 times deeper than the injection well.

16. The enhanced passive soil vapor extraction system described in claim 1, wherein the depth of the deep well is 2–10 times deeper than the injection well.

17. The enhanced passive soil vapor extraction system described in claim 1, wherein the injection well extends down into the waste zone.

18. The enhanced passive soil vapor extraction system described in claim 1, wherein the extraction well extends down in the soil to a depth equal or above the depth of the contaminants.

19. The enhanced passive soil vapor extraction system described in claim 1, further comprising a deep well conduit, the deep well conduit having an upper and lower end, the deep well conduit being fitted within the deep well, the upper end of the deep well conduit being coupled to the transfer conduit.

20. The enhanced passive soil vapor extraction system described in claim 1, further comprising an injection conduit, the injection conduit having an upper and lower end, the injection conduit being fitted within the injection well, the upper part of the injection conduit being coupled to the transfer conduit.

21. The enhanced passive soil vapor extraction system described in claim 20, wherein the injection conduit is made of material selected from the group consisting of ABS, PVC and steel.

22. The enhanced passive soil vapor extraction system described in claim 1, further comprising an extraction conduit, the extraction conduit having an upper and lower end, the extraction conduit being fitted within the extraction well.

23. The enhanced passive soil vapor extraction system described in claim 1, wherein the transfer conduit is made of material selected from the group consisting of ABS, PVC and steel.

24. The enhanced passive soil vapor extraction system described in claim 1, wherein a single extraction well is surrounded by multiple injection wells.

25. The enhanced passive soil vapor extraction system described in claim 1, wherein a single injection well is surrounded by multiple extraction wells.

26. The enhanced passive soil vapor extraction system described in claim 1, wherein the deep well can be used as a monitoring well.

27. The enhanced passive soil vapor extraction system described in claim 1, wherein the extraction well can be used as a monitoring well.

28. An enhanced passive soil vapor extraction system for remediating a site of specified locale that contains soil contaminated with volatile chemicals comprising:

a deep well having an upper and lower end, the deep well having a specified depth and position relative to the contaminated site;

one or more injection wells each having an upper and lower end, each injection well having a specified depth and location relative to the contaminated site, the lower end of the injection well being in fluid communication with the surrounding soil;

a transfer conduit having a first and second end, a portion of the first end of the transfer conduit being coupled to the upper end of the injection well, the second end of the transfer conduit being coupled to the upper end of the deep well;

one or more extraction wells each having an upper and lower end, each extraction well having a specified depth and location relative to the contaminated site, the upper end of the extraction well extending to the land surface, the lower end of the extraction well being in fluid communication with the surrounding soil;

wherein the depth of the deep well provides a great enough pressure differential between the deep well and contaminant site to produce air movement from the deep well, through the system and into the waste zone; and wherein the depth of the deep well is deeper than the injection well.

* * * * *